Nov. 16, 1954     A. G. KORTZ     2,694,284
NUT GATHERING DEVICE
Filed July 14, 1952     2 Sheets-Sheet 1
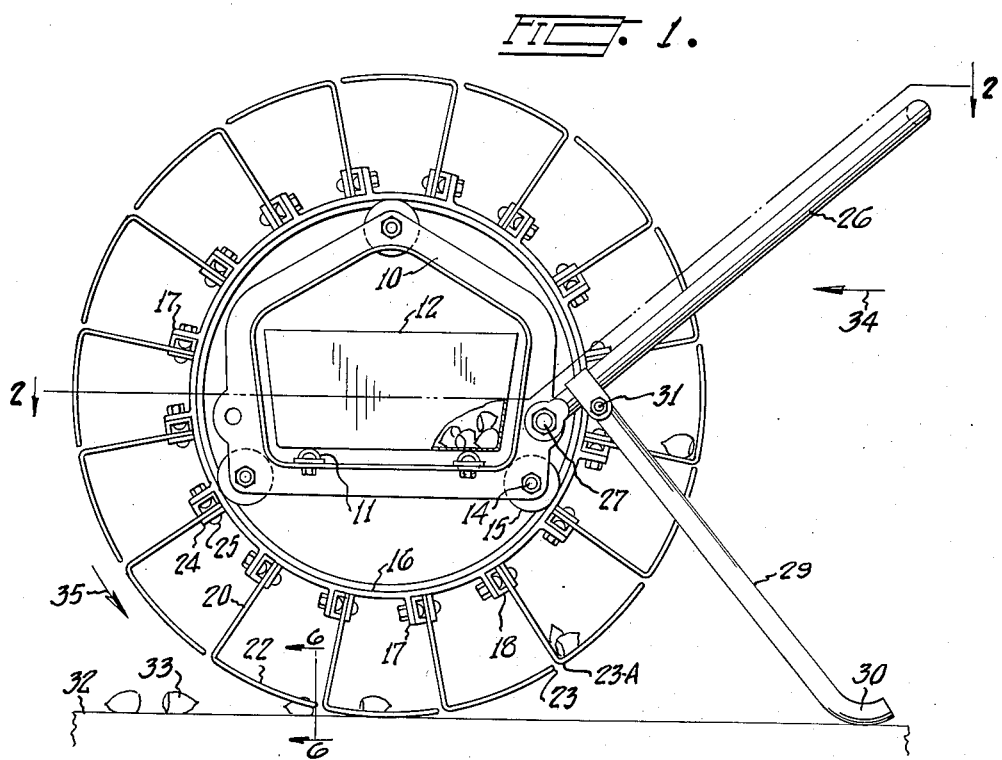
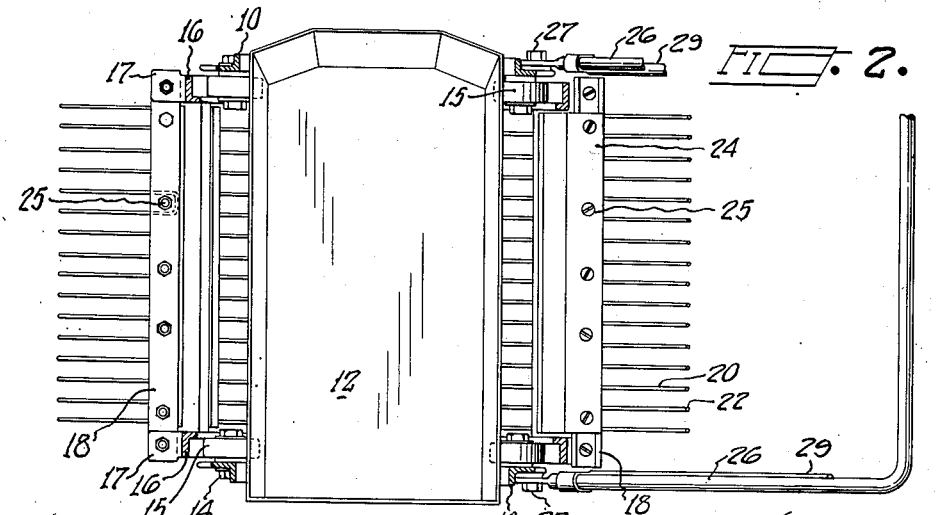
INVENTOR
A. G. KORTZ
ATTORNEY Nov. 16, 1954 A. G. KORTZ 2,694,284
NUT GATHERING DEVICE
Filed July 14, 1952
2 Sheets-Sheet 2
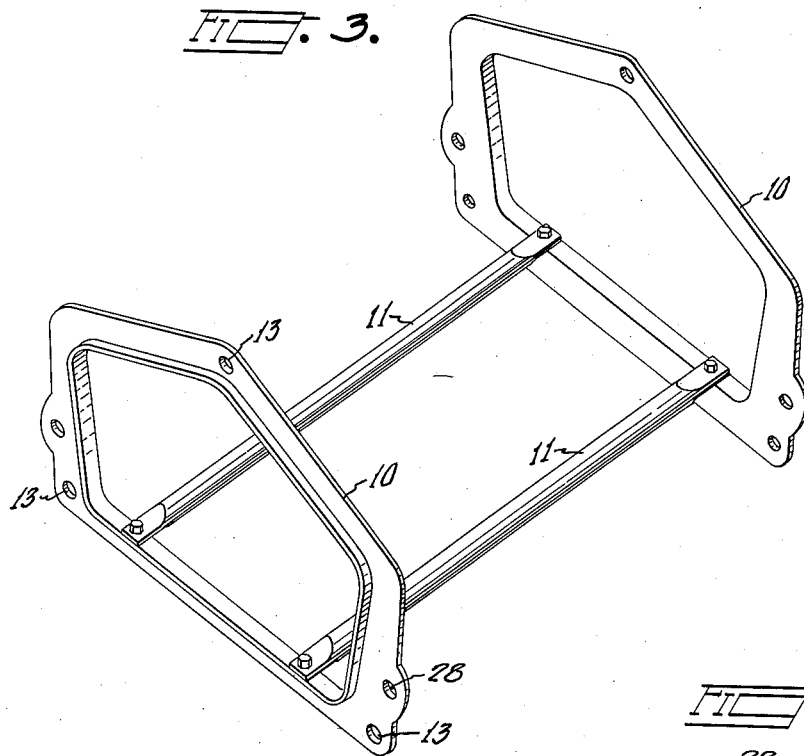
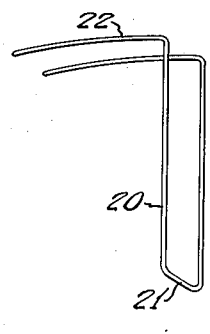
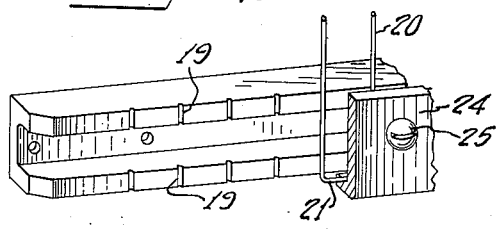
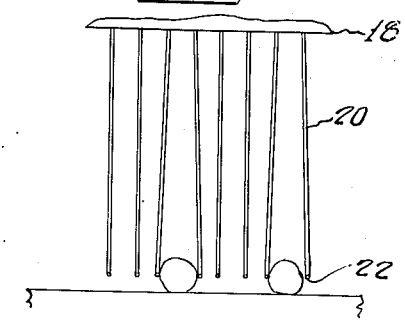
INVENTOR.
A. G. KORTZ
ATTORNEY United States Patent Office 2,694,284
Patented Nov. 16, 1954

2,694,284

NUT GATHERING DEVICE

Arnold G. Kortz, Lebanon, Oreg.

Application July 14, 1952, Serial No. 298,862

5 Claims. (Cl. 56—328)

This invention relates generally to harvesting machinery and particularly to a nut gathering device, by means of which nuts may be gathered or picked up from the ground upon which they have fallen from a tree or bush.

The main object is to provide a means for lowering the cost of nut gathering.

The second object is to make it possible to improve the grade of the nuts by picking them at successive stages to prevent those nuts which fell first from deterioration on the moist ground.

The third object is to construct such a machine in a manner and size which will be relatively low in cost and well within reach of the small grower.

I accomplish these and other objects in the manner set forth in the following specification as illustrated in the accompanying drawings, in which Fig. 1 is a side elevation of the machine with parts broken away and shown in section.

Fig. 2 is a fragmentary sectional view taken along the line 2—2 in Fig. 1.

Fig. 3 is an enlarged perspective view of the main frame.

Fig. 4 is an enlarged fragmentary perspective view with parts broken away and shown in section of the means for holding the nut gathering fingers and spokes.

Fig. 5 is an enlarged perspective view of a spoke and finger unit.

Fig. 6 is an enlarged fragmentary elevation showing a plurality of spokes and the manner in which the fingers pick up the nuts.

Like numbers of reference refer to the same or similar parts throughout the several views.

Referring in detail to the drawings, there is shown in Fig. 3 a pair of side frames 10 which are joined by the ties 11 which form supports for a nut collecting basket 12 which can be made of any desirable material. The frames 10 are open so that the basket 12 can be inserted or removed from either side.

Formed around the frames 10 are the holes 13 for the bolts 14 on which are mounted the rollers 15. Around the rollers 15 are the two spaced rings 16 of angular cross section forming tracks for the rollers 15. Each ring 16 has projecting therefrom the radial lugs 17 to which are secured the channel bars 18. The bars 18 form ties between the rings 16. Each channel bar 18 is provided with notches 19 which receive the radial wire spokes 20 which are joined in pairs by the end 21. The outer end of each spoke 20 has a curved finger 22 which is concentric with relation to the rings 16. The trailing end 23 is close to the leading end 23–A of the next adjacent spoke 20.

The spokes 20 are held rigidly in position in the notches 19 by an angular clamping bar 24 by bolts 25. Thus, while the ends of the spokes 20 nearest the end 21 are rigidly held, the curved portions 22 are laterally yieldable.

In order to propel the device, I have attached thereto a pair of handles 26 by means of bolts 27 which pass through holes 28 in the frames 10. Holes 28 are formed on opposite ends of the frames 10 to permit the handles 26 to be placed at either end as desired for pulling or pushing purposes. A leg 29 is attached to each handle 26 and provided with a rounded foot 30. The legs 29 are secured to the handles 26 by means of bolts 31.

In the operation of the device it is merely rolled over the ground 32, upon which the nuts 33 lie. Such ground is ordinarily rolled smooth before the nuts drop. The nuts 33 are forced between the fingers 22 as the device is moved along the direction of the arrow 34 and the fingers 22 rotate in the circular path in the direction indicated by the arrow 35. This movement carries the nuts 33 uphill until they reach a point where they can slide along the spokes 20 into the basket 12, from which they can be transferred to other containers.

I claim:

1. A nut gathering device comprised of a pair of side frames having openings therethrough and having spacer ties between said frames holding the openings in said frames in axial alignment, each of said frames having a plurality of rollers mounted thereon, a ring of angular cross section rotatably mounted on the rollers of each frame, channel members uniting said rings and holding them in spaced relation on said rollers, each of said channel members having laterally yielding spring spokes secured thereto, the outermost ends of which are curved to conform to a cylindrical surface constituting a cylindrical nut picking element, means for propelling said picking element along the surface of the ground and a container slidably mounted on the ties between said frames.

2. A nut gathering device comprising a cylindrical land travelling picking element composed of laterally yieldable wires formed on the outer ends of radial spokes, cage means for supporting said spokes and permitting them to revolve about a common axis, frames within said cage having cage supporting rollers attached thereto, and a basket extendable through and supported by said frames.

3. A nut gathering device comprising a cylindrical nut picking element including internal track rings and external arcuate laterally yieldable picking fingers, channel bars disposed around said track rings having radial spokes projecting therefrom and terminating in one end of the curved picking finger, side frames having rollers thereon supporting said track rings, ties uniting said frames, a basket slidably mounted on said ties and a handle attached to said frames whereby the picking fingers may be rolled along the surface of the ground and nuts may force their way between said fingers to the top side thereof and to be carried upwardly by said spokes to a point above said basket into which said nuts may slide along said spokes.

4. A nut gathering device comprising a cylindrical ground engaging picker element having parallel rows of arcuate picking fingers forming the ground engaging wheel, said fingers being laterally yieldable, a basket disposed within said cylinder, a frame for supporting said basket, rollers on said frame for supporting said picker element, a handle attached to said frame, and a ground engaging shoe attached to said handle.

5. A filbert picker comprised of a land travelling cylinder having a hollow frame formed of a pair of spaced concentric rings, side frames having rollers thereon supporting said springs, channel bars secured around said rings and connecting them, a pair of handles attached to said frames having ground engaging feet attached to said handles and radial spring wire spokes attached to said channel bars and having their outer ends curved backwardly to conform to the diameter of said cylinder, said spokes and curved ends being laterally yieldable, whereby a rolling action of said cylinder over a nut will cause said curved ends to spread and permit said nut to move into said cylinder and to be carried to the top portion thereof, and a basket removably mounted within said frames into which nuts can slide along said spokes as the spokes upon which they rest incline toward said basket.

References Cited in the file of this patent

UNITED STATES PATENTS

| Number | Name | Date |
|---|---|---|
| 1,240,955 | Denburger | Sept. 25, 1917 |
| 2,413,679 | Binder | Jan. 7, 1947 |
| 2,482,383 | Traverso | Sept. 20, 1949 |
| 2,539,596 | Smith | Jan. 30, 1951 |

FOREIGN PATENTS

| Number | Country | Date |
|---|---|---|
| 802,662 | Germany | Feb. 19, 1951 |